(12) United States Patent
Morrison et al.

(10) Patent No.: US 9,234,426 B2
(45) Date of Patent: Jan. 12, 2016

(54) MINE OPERATION MONITORING SYSTEM

(75) Inventors: Mark Morrison, Wembley Downs (AU); John Usher, Perth (AU); Chris Green, Mosman Park (AU)

(73) Assignee: Technological Resources Pty. Limited, Melbourne (AU)

( * ) Notice: Subject to any disclaimer, the term of this patent is extended or adjusted under 35 U.S.C. 154(b) by 302 days.

(21) Appl. No.: 13/500,778

(22) PCT Filed: Oct. 8, 2010

(86) PCT No.: PCT/AU2010/001328
§ 371 (c)(1),
(2), (4) Date: Sep. 24, 2012

(87) PCT Pub. No.: WO2011/041848
PCT Pub. Date: Apr. 14, 2011

(65) Prior Publication Data
US 2013/0016104 A1 Jan. 17, 2013

(30) Foreign Application Priority Data
Oct. 9, 2009 (AU) .................. 2009904931

(51) Int. Cl.
*G09G 5/00* (2006.01)
*E21F 17/00* (2006.01)
*G05B 19/418* (2006.01)

(52) U.S. Cl.
CPC .......... *E21F 17/00* (2013.01); *G05B 19/41885* (2013.01); *G05B 2219/31466* (2013.01)

(58) Field of Classification Search
None
See application file for complete search history.

(56) References Cited

U.S. PATENT DOCUMENTS

| 5,471,391 | A | 11/1995 | Gudat et al. |
| 5,987,379 | A | 11/1999 | Smith |
| 2005/0107934 | A1 | 5/2005 | Gudat et al. |
| 2005/0283294 | A1 | 12/2005 | Lehman, Jr. et al. |
| 2007/0135137 | A1 | 6/2007 | Olson |
| 2008/0052142 | A1* | 2/2008 | Bailey et al. ............ 705/8 |
| 2008/0243381 | A1* | 10/2008 | Villalobos et al. ............ 701/211 |
| 2009/0202109 | A1* | 8/2009 | Clar et al. ............ 382/104 |
| 2010/0201829 | A1* | 8/2010 | Skoskiewicz et al. ..... 348/211.2 |
| 2010/0313146 | A1* | 12/2010 | Nielsen et al. ............ 715/757 |
| 2011/0053624 | A1* | 3/2011 | Trottier et al. ............ 455/507 |

OTHER PUBLICATIONS

International Search Report from the Australian Patent Office in International Application No. PCT/AU2010/001328 mailed Dec. 9, 2010.

* cited by examiner

*Primary Examiner* — Xiao Wu
*Assistant Examiner* — Mohammad H Akhavannik
(74) *Attorney, Agent, or Firm* — Banner & Witcoff, Ltd.

(57) ABSTRACT

A method of monitoring a mine operation is disclosed. The method comprises collecting map data associated with a mine operation, the map data being indicative of at least one map representation associated with the mine operation, collecting mine equipment location data indicative of the location of at least one item of mine equipment relative to the mine operation, and facilitating selection and display of a map representation associated with a mine operation. When a map representation associated with a mine operation is displayed, a representation of at least one item of mine equipment on the map representation at a representative location relative to the mine operation.

15 Claims, 3 Drawing Sheets

MINE OPERATION MONITORING SYSTEM

CROSS REFERENCE TO RELATED APPLICATIONS

This application is a National Phase application based on PCT/AU2010/001328 filed on Oct. 8, 2010, the contents of which are incorporated herein by reference and claims the priority of Australian Application No. 2009904931, filed on Oct. 9, 2009, the contents of which are incorporated herein by reference.

FIELD OF THE INVENTION

The present invention relates to a mine operation monitoring system.

BACKGROUND OF THE INVENTION

It is known to provide a computer implemented map tool which enables a user to select and display map representations at desired resolutions. Such map representations are generally photographic images for example obtained using satellite imaging and periodically updated, generally once or twice per year.

However, such a map tool has limited use in relation to mine operations since the photographic images quickly become too old.

It is also known to provide still and/or video cameras at mine operations and to equip the cameras with network interfaces so that a user in networked communication with the cameras can obtain images of the mine operation from a remote location.

However, while such cameras provide a viewer with real time or near real time information, since the cameras are disposed at dedicated locations, a viewer is only able to derive limited information about operation of the mine operation.

SUMMARY OF THE INVENTION

In accordance with a first aspect of the present invention, there is provided a method of monitoring a mine operation, the method comprising:
  collecting map data associated with a mine operation, the map data being indicative of at least one map representation associated with the mine operation;
  collecting mine equipment location data indicative of the location of at least one item of mine equipment relative to the mine operation;
  facilitating selection and display of a map representation associated with a mine operation; and
  when a map representation associated with a mine operation is displayed, dynamically displaying a representation of at least one item of mine equipment on the map representation at a representative location relative to the mine operation.

It will be understood that in this specification the term "dynamically displaying" in relation to a representation of an item refers to displaying the item in real time or pseudo real time such that a representation which is associated with an item of mine equipment at a mine operation appears to move as the item of equipment moves. This may be achieved by displaying a representation and subsequently redisplaying the representation after a time interval which may be very short such that the representation appears to move continuously, or which is several seconds or more duration.

In one embodiment, the method comprises displaying status information associated with the representation of at least one item of mine equipment.

In one embodiment, each item of mine equipment has an associated equipment identifier representative of the item of equipment.

The method may comprise facilitating selection of an equipment identifier and displaying status information associated with the equipment identifier when the equipment identifier is selected.

In one embodiment, the status information associated with the equipment identifier may be displayed as text.

The method may comprise displaying an equipment identifier arranged such that status information is discernible by the appearance of the equipment identifier.

In one embodiment, the method is arranged such that at least one equipment identifier has a plurality of associated discernible identifier modifications and each identifier modification is associated with a different status. The discernible identifier modifications may comprise different identifier colours and/or different identifier features.

The identifier modifications may correspond respectively to different speeds of a moving item of equipment, different maintenance states such as whether an item of equipment is due for a service, different load carrying states such as empty or full, and/or different operational status such as whether an item of equipment is operational or non-operational.

In one embodiment, the method comprises providing each item of equipment with a data collecting device which may be arranged to collect location information, for example using GPS, and/or to collect status information from the item of equipment.

The method may comprise providing each item of equipment with a wireless network interface arranged to facilitate wireless transfer of location and status information from the item of equipment.

In one embodiment, the method comprises collecting map data not associated with a mine operation and facilitating selection and display of a map representation not associated with a mine operation. In one arrangement, the map data associated with a mine operation and the map data not associated with a mine operation are derived from different sources.

In one embodiment, the map data is associated with reference location information and the method comprises using the collected mine equipment location data indicative of the location of at least one item of mine equipment relative to the mine operation and the reference location information associated with the map data to determine the representative location of at least one item of equipment on the map representation.

In one embodiment, the map data associated with a mine operation comprises a plurality of data layers, for example a map imagery layer, a terrain data layer and a vector data layer.

In one embodiment, the map data associated with a mine operation comprises any one or more of map imagery, for example sourced from satellite or aerial surveys; terrain data; cadastral tenement data; drill collar data and downhole drill hole information; environmental data such as data indicative of acid sulphate soils, environmentally sensitive areas, rehab areas, weed locations, cyclone paths and wild rivers; ground disturbance data; hydrology data; infrastructure data; mine planning data including mine layouts; operational data including modular live data and pit locations, and data indicative of short term planning and grade control active blocks;

regional data including data indicative of coast lines, national parks and towns; and/or data indicative of the weather and/or of fire hot spots.

In one embodiment, the method comprises facilitating selection of the resolution of the displayed map representation. The method may comprise dynamically displaying a representation of at least one item of mine equipment on the map representation only when the resolution is higher than a defined level.

In one embodiment, the method comprises periodically refreshing the mine equipment location data and updating the display location of the at least one representation of at least one item of mine equipment and between refreshes extrapolating and displaying the relative position of the item of equipment.

The method may comprise providing a client device controllable by a user, and at least one server arranged to serve map data and mine equipment location data to the client device in response to control of the client device by the user. The client device may be implemented using a web browser. In one embodiment, a map server is provided for serving map data to the client device and a dynamic data server is provided for serving mine equipment location data to the client device.

In one embodiment, the method comprises monitoring a plurality of mine operations. Each mine operation may have an associated equipment database arranged to store mine equipment location data and status information derived from one or more items of equipment associated with the mine operation.

In one embodiment, the system is arranged such that selection of an equipment identifier initiates a video and/or still camera feed from a camera in the vicinity of the item of equipment associated with the selected equipment identifier, for example disposed on a truck or on a communications base station.

In one embodiment, a mine operation may comprise at least one mine site, at least one port facility and/or at least one rail network. The mine operation may be an underground mine operation, wherein the map data comprises images of the mine operation taken from underground.

The mine equipment location data may comprise GPS data.

In accordance with a second aspect of the present invention, there is provided a system for monitoring a mine operation, the system comprising:

map data associated with a mine operation, the map data being indicative of at least one map representation associated with the mine operation;

at least one data collecting device, each data collecting device being associated with an item of mine equipment and being arranged to collect mine equipment location data indicative of the location of the item of mine equipment relative to the mine operation; and a client device controllable by a user, the client device being arranged to facilitate selection by a user and display of a map representation associated with a mine operation, and when a map representation associated with a mine operation is displayed, to dynamically display a representation of at least one item of mine equipment on the map representation at a representative location relative to the mine operation.

In accordance with a third aspect of the present invention, there is provided a client device for a system for monitoring a mine operation, the client device being arranged to:

facilitate selection by a user of a map representation associated with a mine operation;

retrieve the selected map representation from a map data storage device;

display the selected map representation;

retrieve mine equipment location data indicative of the location of at least one item of mine equipment relative to the map representation from at least one data collecting device associated with the at least one item of mine equipment; and when a selected map representation associated with a mine operation is displayed, dynamically display a representation of the at least one item of mine equipment on the map representation at a representative location relative to the mine operation.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
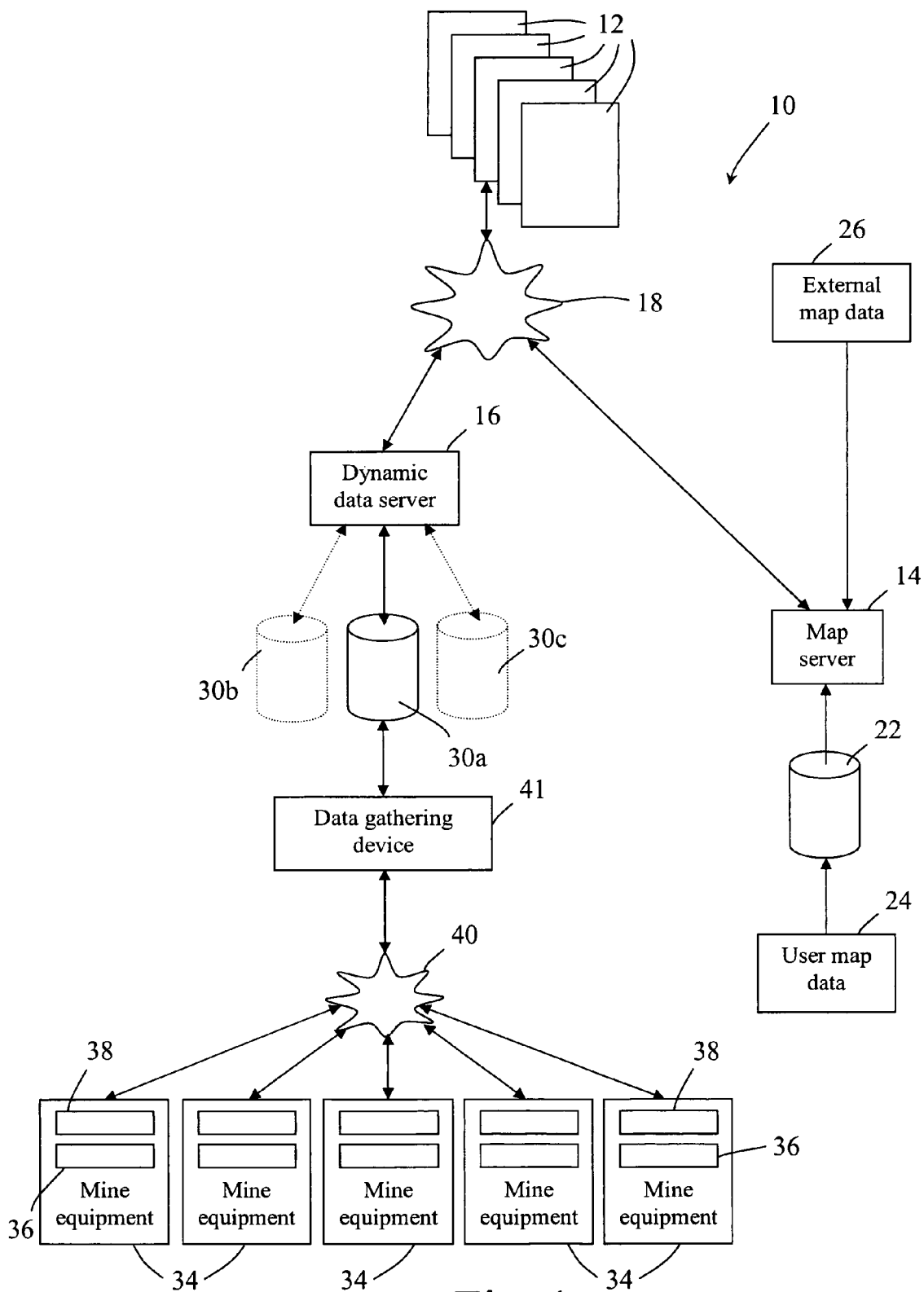
FIG. 1 is a schematic block diagram of a mine monitoring system according to an embodiment of the present invention.

Referring to the drawings, there is shown a mine monitoring system 10 arranged to provide a visual representation of a mine operation and to provide a dynamically changing visual representation of mine equipment disposed at the mine operation.

In this example, the mine monitoring system 10 is arranged under control of a user to display selected map representations at selected resolutions. The present system is capable of monitoring multiple mine operations, with each mine operation being viewable by causing the display engine to zoom in on a selected mine operation thereby increasing the resolution of the mine operation.

In this example, the mine operations may comprise mine sites, one or more port facilities, and/or one or more rail facilities, although it will be understood that the invention is applicable to any operation associated with extracting, handling, processing or transporting bulk commodities in a mining environment.

Each mine site may be of open pit or underground type, and each mine site typically produces a single bulk commodity, such as iron ore, coal or bauxite, and may be serviced by a rail network comprising rail lines that transport the bulk commodities produced at the mine sites to a port facility, or other facility incorporating a stock yard for storage and/or processing of the bulk commodities.

In operation, each mine site has daily, weekly, monthly and annual schedules for mining of ore and waste. Transportation of ore from each of the mine sites to a port or other dispatch facility.

The plant and equipment (hereinafter referred to as 'equipment') disposed at the mine operations include data gathering devices arranged to gather status information, which may include operational information associated with the equipment, and to forward the gathered information to an equipment monitoring device, for example using wireless communications. The status information may include information indicative of whether an item of equipment is operational or idle; whether the item of equipment, such as a truck, is full or empty; whether the item of equipment is moving; whether the item of equipment requires maintenance; and so on.

It will also be understood that the status information may comprise information indicative of the action currently being carried out by an item of equipment. For example, whether a truck is in the process of refuelling, moving ore between an excavator and processing plant such as a crusher or between an excavator and a stock pile (whether a product or waste pile), and so on.

The equipment at a mine site may include crushers, screens, conveyor belts, stackers & reclaimers, train load out facilities, fuelling stations, drilling machines, and/or mobile equipment including trucks and excavators. The equipment at a rail network may include locomotives, track based signalling systems, points, wayside equipment and/or wayside signals. The equipment at the port facility may include rail car unloading facilities, conveyor belts, stackers & reclaimers and/or ship loaders. However, it will be understood that any monitorable and/or controllable equipment for use at a mine operation is envisaged.

The items of equipment at a mine operation may be at least partially manually controlled by human operators or may be autonomously controlled.

The mine monitoring system 10 in this example includes a client device 12 for each user of the system 10, each client device in the present embodiment being implemented as a client display engine on a computing device such as a personal computer.

Using a client device 12, a user is able to select a map location desired to be viewed and a resolution for the desired map location, and in response to the selection the client device 12 extracts map data associated with the selected map location and at the selected resolution from a map server 14. If the selected map location corresponds to a mine operation and the selected resolution is sufficiently high, the client device 12 also retrieves mine equipment location data from a dynamic data server 16, the mine equipment location data being indicative of the type of equipment and the location of the equipment in relation to the mine operation. After gathering the map data and the mine equipment location data, a visual representation of the mine operation is displayed, including a map representation of the mine operation at the selected resolution and representations of the mine equipment overlaid onto the map representation at relevant respective locations.

In this example, each client device 12 is arranged to refresh the mine equipment location data and the status information every 10 seconds and, if an item of equipment is moving, to extrapolate the location of the mine equipment relative to the mine operation between refreshes so that a user is presented with a map representation of a mine operation overlaid with representations of the mine equipment which move dynamically as the actual mine equipment moves.

In this embodiment, the client devices 12 communicate with the map server 14 and the dynamic data server 16 through a wide area network, in this example the Internet 18.

As an alternative to a client device implemented using a dedicated program, the client device 12 may take the form of a conventional web browser, and the dynamic data server 16 and the map server 14 arranged to interact with the web browser in order to serve map data to the web browser.

In this embodiment, the map server 14 is arranged to serve user map data 24 to the client devices 12 from a user map database 22, the user map data 24 being populated into the database 22 by a user. In this example, the user map data 24 is indicative of two dimensional map representations of one or more mine operations which may include rendered images and/or photographic images periodically obtained using an aircraft or helicopter, for example every 2 weeks or longer depending on the rate of excavation of the mine.

The user map data 24 has location information associated with it, for example in the form of GPS coordinate data, so that the locations of mine equipment, infrastructure, defined regions, and boundaries can be accurately determined in relation to a map representation by associating derived GPS data with the GPS data linked to the map data 24.

The images of the mine site taken from a plane/helicopter are preferably geographical referenced images. Such images are obtained by ensuring that geographical registration points located on the mine site are included within the obtained images. The registration points are typically large white crosses that are rendered onto the ground of the mine site. Typically, the image is also corrected based on the altitude of the plane at the time of taking the photograph and for distortions arising from the camera lens. An image of a mine site that is geographically referenced in this way can be referred to as a cartesian image.

The user map data may comprise a plurality of data layers including map imagery, for example sourced from satellite or aerial surveys; terrain data; cadastral tenement data; drill collar data and downhole drill hole information; environmental data such as data indicative of acid sulphate soils, environmentally sensitive areas, rehab areas, weed locations, cyclone paths and wild rivers; ground disturbance data; hydrology data; infrastructure data; mine planning data including mine layouts; operational data including modular live data and pit locations, and data indicative of short term planning and grade control active blocks; regional data including data indicative of coast lines, national parks and towns; and data indicative of the weather and fire hot spots.

The user map data in this example is in Vulcan™ format and accordingly is converted to KML format for use by the client devices 12. Vulcan™ mine planning software is available from Maptex Pty Ltd in Australia. KML is the openGIS® encoding standard maintained by the Open Geospatial Consortium, Inc.

The map server 14 is also arranged to serve externally sourced map data 26 to the client devices 12, the external map data relating to map representations corresponding to map locations other than mine operation locations. For example, the external map data may be obtained from a proprietary source.

In one embodiment, the map server comprises a Google Earth Enterprise server provided by Google Inc., although it will be understood that any suitable map server is envisaged.

The dynamic data server 16 is arranged to serve mine equipment location data and status information to the client devices 12 from one or more equipment databases 30a, 30b, 30c, each equipment database being associated with a mine operation and holding mine equipment data including mine equipment location data and status information for mine equipment 34 disposed at the mine operation. This may be achieved by the dynamic data server 16 polling the equipment databases 30 for data required by the client devices 12 in order to display the equipment location information and status information associated with the requested map representations at periodic intervals, or in any other way.

In this example, the dynamic data server 16 is also arranged to convert the data stored in the mine operation databases 30 to KML format which is more readily recognisable by the client devices 12.

In FIG. 1, for reasons of clarity, only mine equipment 34 associated with a first mine operation database 30a are shown. However, it will be understood that in practice multiple mine operations may be monitored by the system and, accordingly, multiple equipment databases 30b, 30c and respective associated mine equipment 34 may be provided.

Each item of mine equipment 34 has an associated data collecting device 36 arranged to collect data from the mine equipment such as location information, for example using a GPS device. The data collecting device 36 is also arranged to collect status information, for example information as to whether the item of mine equipment is operational; if the mine equipment is a truck, information indicative of whether the truck is full or empty; information indicative of the speed and/or destination of the truck, and so on. Each item of mine equipment also has an associated network interface 38 arranged to facilitate wireless communications between the mine equipment 34 and the data gathering device 41, for example through a wireless network such as a wireless LAN 40.

Data derived from the mine equipment 34 is populated into the mine operation database 30a associated with the mine operation by each data gathering device 41. This may be achieved by the associated data gathering device 41 periodically polling the data collecting devices 36, or in any other way.

In this embodiment, the data derived from the mine equipment is populated into the mine operation databases 30 using software provided by Modular Mining Systems Inc., including Powerview and Dispatch software packages, and for drilling machines, from a drill hole database managed by acQuire software provided by acQuire Technology Solutions Pty Ltd.

Figure 2A:
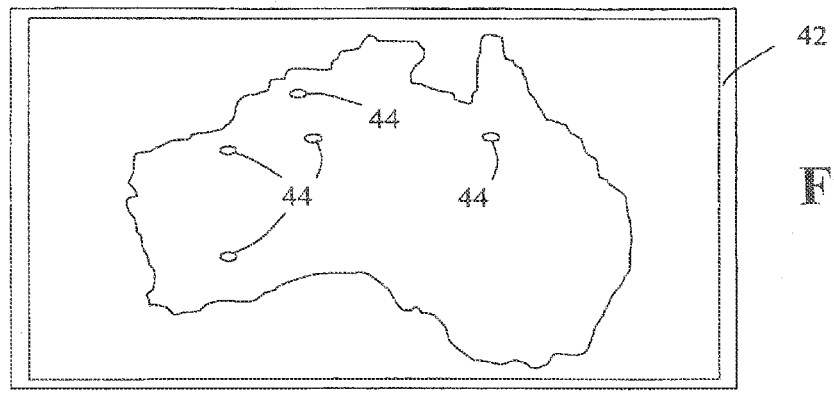
FIGS. 2A to 2C show representations of a mine operation on a display of the system during use at different resolutions.
Figure 2B:
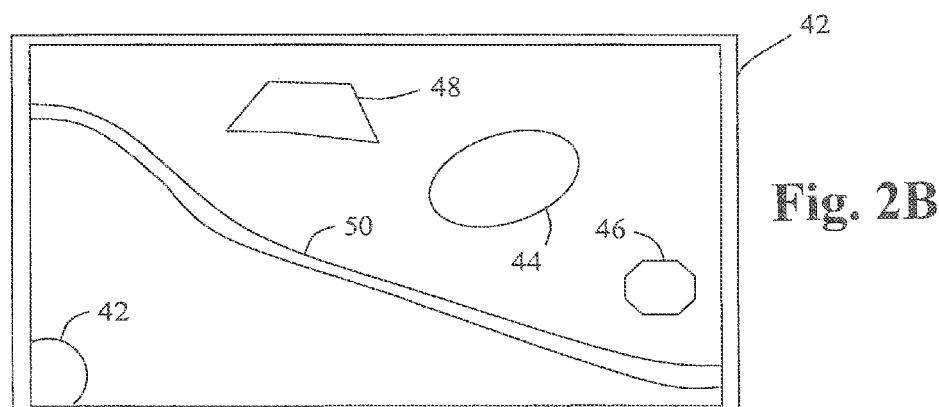
Figure 2C:
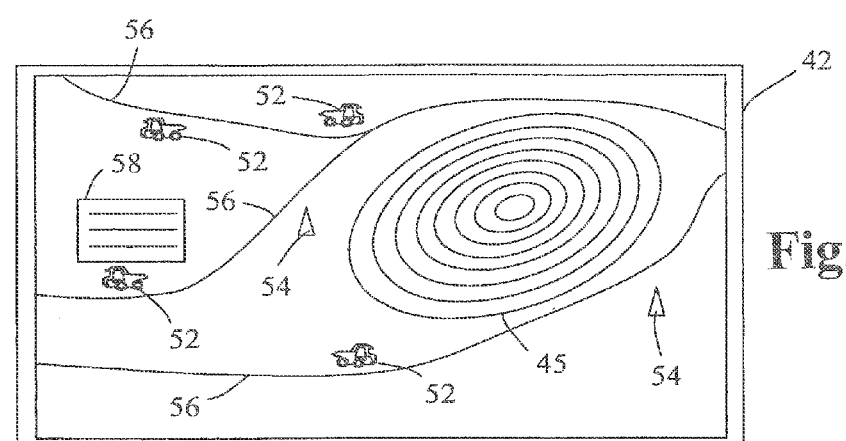

As shown in FIGS. 2A to 2C, using the client device 12 a user is able to show on a display 42, for example a display of the computing device implementing the client device 12, a map representation of a selected map location at a desired resolution, for example by controlling the client device 12 using a mouse. This may be achieved by a user first directing the client device to display a representation of a relatively wide map area, such as a country, as shown in FIG. 2A, then controlling the client device 12 so as to cause the map location to be displayed with more specificity and thereby at a higher resolution, as shown in FIG. 2B, until a map representation of a selected mine operation is displayed, as shown in FIG. 2C.

In this example, the client device may be controlled to cause a selected mine operation to be displayed in any way, such as by providing zoom controls enabling a user to increase or decrease the displayed resolution centred on a selected location, or by providing mine operation icons 44, as shown in FIG. 2A, which when selected cause the client device 12 to automatically zoom in on the selected mine operation.

In the example shown in FIGS. 2A, 2B and 2C, FIG. 2A shows a map representation of Australia including selectable mine operation icons 44; FIG. 2B shows a view of a map region including a selected mine operation, the region including a town 46, a defined area 48, and a river 50; and FIG. 2C shows a map representation of a selected mine operation including representations of a mine 45, representations of transportation routes 56, and mine equipment identifiers, in this example including trucks 52 and movable base stations 54 overlaid onto the map representation.

In this example, data indicative of map representations of mine locations 44 is derived from the user map database 22, and all other map location data is derived from a third party provider.

Figure 3A:
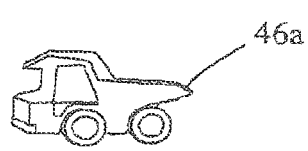
FIGS. 3A to 3D show variations in representing status information associated with mine equipment monitored according to an embodiment of the present invention.
Figure 3B:
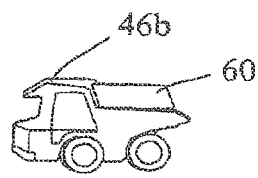
Figure 3C:
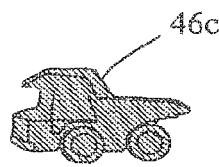
Figure 3D:
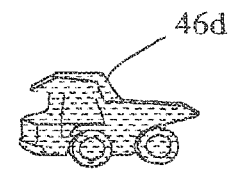
Figure 3E:
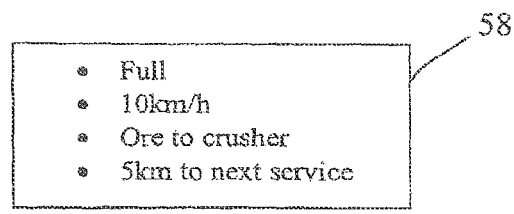
Figure 3E:

The system may be arranged such that each equipment identifier 52, 54 has associated status information 58 which in this example is viewable by clicking on or disposing a mouse cursor over the equipment identifier 52, 54, as shown in FIGS. 2 and 3E. In this embodiment, in relation to a truck 52, the status information includes information as to whether the truck is full, the speed of the truck, its destination and information indicative of when the truck should next be serviced or refuelled.

The system may be arranged such that each equipment identifier 52, 54 changes according to the state of the equipment so that at least some state information is readily discernable from the identifiers 52, 54. For example, an equipment identifier may be modified such that at least one feature of the equipment identifier changes as the state of the item of equipment changes. In one example, a truck which is empty may be shown with no discernable load, as shown in FIG. 3A, and a truck which is at least partially full may be shown with a discernable load, as shown in FIG. 3B. In addition or alternatively, a truck travelling to a pickup location may be represented in a first colour, as shown by first shading in FIG. 3C, and a truck travelling from a pickup location may be represented in a second colour, as shown by second shading in FIG. 3C. In addition, colour may be used to indicate the speed of a truck, and so on.

It will be appreciated that the system may be arranged such that by appropriate selection of an equipment identifier 52, 54, for example by double clicking on the equipment identifier, a video and/or still camera feed may be initiated with a camera in the vicinity of the item of equipment associated with the selected equipment identifier, for example disposed on a truck or on a communications base station. The images and/or video from the camera(s) may be displayed on the map, for example adjacent the equipment identifier 52, 54 associated with the camera, or elsewhere.

While the above embodiments are described in relation to an above ground mine operation, it will be appreciated that the invention is also applicable to an underground mine operation. With this arrangement, the map data may comprise photographic images of the mine operation taken from underground. Also with this arrangement, it may be necessary to modify the system such that the respective positions of items of equipment may still be determined even though the items of equipment are located underground.

Modifications and variations as would be apparent to a skilled addressee are deemed to be within the scope of the present invention.

The invention claimed is:

1. A method of monitoring a mine operation, the method comprising:
    collecting map data associated with a mine operation, the map data being indicative of at least one map representation associated with the mine operation;
    collecting mine vehicle location data indicative of the location of at least one mine vehicle relative to the mine operation;
    facilitating selection and display of a map representation associated with a mine operation; and
    when a map representation associated with a mine operation is displayed, dynamically displaying at least one mine vehicle identifier on the map representation at a representative location relative to the mine operation, the mine vehicle identifier visually representative of a mine vehicle such that the mine vehicle identifier has the appearance of a mine vehicle;
    displaying status information associated with at least one mine vehicle, the status information discernible by the appearance of the mine vehicle identifier;
    wherein at least one mine vehicle identifier has a plurality of different associated discernible identifier modifications, each identifier modification being visually representative of the appearance of a respective mine vehicle and each identifier modification being associated with a different status corresponding to:
   whether the mine vehicle is full or empty;
   and
wherein in response to a change in status of an item of a mine vehicle, the appearance of the mine vehicle identifier associated with the mine vehicle dynamically changes to show a different identifier modification and thereby indicate the change in status of the mine vehicle.

2. A method as claimed in claim 1, wherein the discernible identifier modifications comprise different identifier colours and/or different identifier features.

3. A method as claimed in claim 2, wherein the identifier modifications correspond respectively to different maintenance states and/or different operational status.

4. The method as claimed in claim 1 wherein the each identifier modification is further associated with a different status corresponding to:
   the direction of travel of the mine vehicle; or
   the speed of the mine vehicle.

5. A system for monitoring a mine operation, the system comprising:
   map data associated with a mine operation, the map data being indicative of at least one map representation associated with the mine operation;
   at least one data collecting device, each data collecting device being associated with a mine vehicle and being arranged to collect mine vehicle location data indicative of the location of the item of mine vehicle relative to the mine operation;
   a client device controllable by a user, the client device being arranged to facilitate selection by a user and display of a map representation associated with a mine operation, and when a map representation associated with a mine operation is displayed, to dynamically display at least one mine vehicle identifier on the map representation at a representative location relative to the mine operation, the mine vehicle identifier visually representative of a mine vehicle such that the mine vehicle identifier has the appearance of a mine vehicle;
   wherein the client device is arranged to display status information associated with at least one mine vehicle, the status information discernible by the appearance of the mine vehicle identifier;
   wherein at least one mine vehicle identifier has a plurality of different associated discernible identifier modifications, each identifier modification being visually representative of the appearance of a respective mine vehicle and each identifier modification being associated with a different status corresponding to:
      whether the mine vehicle is full or empty;
      and
   wherein in response to a change in status of a mine vehicle, the appearance of the mine vehicle identifier associated with the item of mine vehicle dynamically changes to show a different identifier modification and thereby indicate the change in status of the mine vehicle.

6. A system as claimed in claim 5, wherein the map data is associated with reference location information and the system is arranged to use the collected mine vehicle location data indicative of the location of at least one item of mine vehicle and the reference location information associated with the map data to determine the representative location of at least one mine vehicle on the map representation.

7. A system as claimed in claim 5, wherein the map data associated with a mine operation comprises a plurality of data layers.

8. A system as claimed in claim 5, wherein the map data associated with a mine operation comprises any one or more of map imagery; terrain data; cadastral tenement data; drill collar data and downhole drill hole information; environmental data; ground disturbance data; hydrology data; infrastructure data; mine planning data including mine layouts; operational data; regional data including data indicative of coast lines, national parks and towns; and/or data indicative of the weather and/or of fire hot spots.

9. A system as claimed in claim 5, wherein the client device is arranged to facilitate selection of the resolution of the displayed map representation.

10. A system as claimed in claim 5, wherein the system is arranged to dynamically display a representation of a mine vehicle on the map representation only when the resolution is higher than a defined level.

11. A system as claimed in claim 5, wherein the system is arranged to periodically refresh mine vehicle location data and to update the display location of the at least one representation of at least one item of mine vehicle and between refreshes to extrapolate and display the relative position of the item of equipment.

12. A system as claimed in claim 5, comprising at least one server arranged to serve map data and mine vehicle location data to the client device in response to control of the client device by the user.

13. A system as claimed in claim 5, comprising a plurality of equipment databases, each equipment database arranged to store mine equipment location data and status information derived from one or more items of equipment associated with a different mine operation.

14. A system as claimed in claim 5, comprising a still and/or video camera in the vicinity of an item of equipment associated with an equipment identifier, wherein the system is arranged such that selection of the equipment identifier initiates a video and/or still camera feed from the camera.

15. The system as claimed in claim 5 wherein the each identifier modification is further associated with a different status corresponding to:
   the direction of travel of the mine vehicle; or
   the speed of the mine vehicle.

* * * * *